United States Patent [19]

Nagai

[11] Patent Number: 5,689,824
[45] Date of Patent: Nov. 18, 1997

[54] FOLDING PORTABLE WIRELESS APPARATUS CAPABLE OF AUTOMATICALLY OPENING UPPER AND LOWER CASES

[75] Inventor: Michio Nagai, Tokyo, Japan

[73] Assignee: NEC Corporation, Tokyo, Japan

[21] Appl. No.: 502,810

[22] Filed: Jul. 14, 1995

[30] Foreign Application Priority Data

Jul. 15, 1994 [JP] Japan .................................. 6-186420

[51] Int. Cl.$^6$ .................................................. H04B 1/38
[52] U.S. Cl. ........................ 455/89; 455/90; 455/347; 16/232; 379/433; 429/97; 429/100
[58] Field of Search ..................... 455/89, 90, 344, 455/349, 351, 347; 379/428, 433, 434, 58; 429/96, 97, 98, 99, 100; 16/321, 326, 371, 374, 232, 342; 70/69

[56] References Cited

U.S. PATENT DOCUMENTS

| | | | |
|---|---|---|---|
| 3,999,110 | 12/1976 | Ramstrom et al. | 320/2 |
| 4,371,594 | 2/1983 | Ohara | 429/97 |
| 5,168,278 | 12/1992 | Morita | 343/702 |
| 5,436,954 | 7/1995 | Nishiyama et al. | 379/58 |
| 5,535,437 | 7/1996 | Karl et al. | 455/90 |

FOREIGN PATENT DOCUMENTS

| | | |
|---|---|---|
| 2048460 | 2/1992 | Canada . |
| 63-86929 | 4/1988 | Japan . |
| 4-307841 | 10/1992 | Japan . |
| 706630 | 3/1954 | United Kingdom . |

*Primary Examiner*—Reinhard J. Eisenzopf
*Assistant Examiner*—Lee Nguyen
*Attorney, Agent, or Firm*—Scully, Scott, Murphy & Presser

[57] ABSTRACT

A folding portable wireless apparatus of the invention is provided with locking mechanisms provided on the both side faces of an upper and a lower case which are so configured as to be capable of opening and closing. The locking mechanisms have open levers which are provided on the both side faces of either the upper or the lower case and can be manually operated. To the both side faces of the other case are provided engaging portions which interlock with the open levers to lock the both cases, and locking impetus giving members for giving an impetus to the open levers are also provided in such a direction that the locked state established between the open levers and the engaging portions is maintained. In this structure, since the opening operation is carried out by both a thumb and an index fingers of a hand holding the portable wireless apparatus, the easy and rapid opening operation is possible no matter which hand may being holding the wireless apparatus.

1 Claim, 4 Drawing Sheets

FOLDING PORTABLE WIRELESS APPARATUS CAPABLE OF AUTOMATICALLY OPENING UPPER AND LOWER CASES

BACKGROUND OF THE INVENTION

1. Field of the Invention

The present invention relates to a portable wireless apparatus such as a folding portable telephone, and more particularly to a portable wireless apparatus capable of automatically opening cases.

2. Description of the Related Art

A portable wireless apparatus is provided with a receiver, a transmitter, a key operation portion composed of various keys and a display for displaying time and various information at surface portion of a case accommodating a wireless unit therein. Since the receiver and the transmitter must be located in correspondence with an ear and a mouth of a user in its use in this type of portable wireless telephone, the distance between the receiver and the transmitter secured in accordance with the distance between the human ear and mouth results in the entirely-large size of the apparatus, deteriorating the portability. There is thus provided a folding portable wireless apparatus.

The receiver and the display portion are provided to an upper case while the transmitter and the key operation portion are disposed to a lower case, and these upper and lower cases are assembled through a hinge portion so as to be opened and/or closed. The distance between the receiver and the transmitter can be set to a predetermined dimension by folding the cases to realize a compact size when carried and by opening the enclosed bodies to be extended when used.

This type of folding portable wireless apparatus, however, requires such an operation that one case (the lower case) is held by one hand while the other case (the upper case) is opened by the other hand, and hence the operation using the both hands may be troublesome for the user.

In recent years, therefore, a portable wireless apparatus which is opened and closed by the operation using a button has been proposed. For example, in a wireless apparatus disclosed in Japanese patent laid-open publication No. Showa 63-86929, the opening/closing mechanism of the folding case is released by pushing a button provided on one side of the case of the wireless apparatus which can be folded, and the case is opened by an elastic force of a spring. Further, in a portable telephone disclosed in Japanese patent laid-open publication No. Heisei 4-307841, the cover is opened in a one-tough manner with an action of a spring by releasing a hook interlocked with a call button.

In these conventional opening/closing structure, however, a case is designed to be opened by pushing a button provided on one side of the case in the portable wireless apparatus. In general, the portable wireless apparatus is often designed on the assumption that the pushing operation would be carried out by a thumb of a user. When the portable wireless apparatus is held by one hand, it is therefore difficult to operate the button by using a thumb in some cases and the rapid opening operation may be impossible. In addition, the button is so configured as to be pushed against one side of the case. Since the case is pressed against the other side when pushed, the case must be securely held by a hand for receiving the pushing force, requiring the large force in the hand during the pushing operation.

In such a case, the increase in the force for pushing the button involves the increase in the operation force at the time of the pushing opening the case, and a fingertip may hurt at the time of operation. On the contrary, if the operation force is decreased, the case may be opened by erroneously touching the button when holding the portable wireless apparatus, which may leads to a possibility such that the portable wireless apparatus would be dropped by the shock caused then. In particular, since the button is often provided so as to protrude from the surface of the case of the portable wireless apparatus, the button is often unwillingly touched and pushed when handling the apparatus.

In the above-described patent laid-open publications, since the structure showing the relationship between the button and the engaging/undoing mechanism is not concretely explained, it is not apparent how the engaging/undoing mechanism is actually released by pushing the button, and the disclosure of these publications can not be directly utilized.

SUMMARY OF THE INVENTION

In view of the above-described drawbacks, it is therefore an object of the present invention to provide a folding portable wireless apparatus with which such an operability that the case being closed can be opened in one-touch manner is improved.

Further, it is another object of the present invention to provide a folding portable wireless apparatus having a concrete structure which can actually apply the operation for opening the case in the one-touch manner.

To this end, according to one aspect of the present invention, there is provided a folding portable wireless apparatus including locking mechanisms provided to the both sides of an upper case and a lower case which can be opened and closed. The locking mechanisms are constituted by: open levers which are provided on the both sides of either the upper case or the lower case and can be manually operated; engaging portions which are provided on the both sides of the other case and operates with the open levers to lock the both cases; and locking impetus giving members for giving an impetus to the open levers in a direction the locked state between the open levers and the engaging portions is maintained.

Here, the open levers are provided to the both sides of one case so as to be capable of swinging, and one end of each open lever protrudes from the surface of the enclosed body so that a hook or a locking groove is formed to a part thereof. The engaging portions are provided to the both sides of the other case, and each of the engaging portions may be preferably constituted by a locking groove or a hood with which a hook or a locking groove engages.

In addition, it is preferable that: the open levers can oscillate in a direction of the thickness of one case; one end of each open lever protrudes from the front face of the case; a hook or a locking groove is formed to the inner surface of the one end of the same; and the one end of the same is inwardly given an impetus by each locking impetus giving member.

Further, it is preferable that the open levers are mounted in shallow concave portions provided to the both sides of one case and the surface of each open lever is located on the same plane level with the side face of the case.

According to the present invention, since the opening operation is carried out by using a thumb and an index finger of a hand holding the portable wireless apparatus, the easy and rapid opening operation is possible, no matter which hand may hold the wireless apparatus. Further, since the locked state is released in such a manner the open levers are pinched from the both sides, the force against one side of the case does not act during the operation, thus requiring no large force at the time of operation. In addition, the open levers are operated by their oscillation, the operation force can be reduced by the lever ratio in the open levers even if the engaging force between the open levers and the engaging portions.

Furthermore, since the open levers are mounted in the shallow concave portions provided to the both sides of one case and the surface of each open lever is positioned on the same plane level with the side face of the case, it is possible to prevent releasing of the locked state which is caused when unwillingly touching the open levers during the handling of the portable wireless apparatus.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
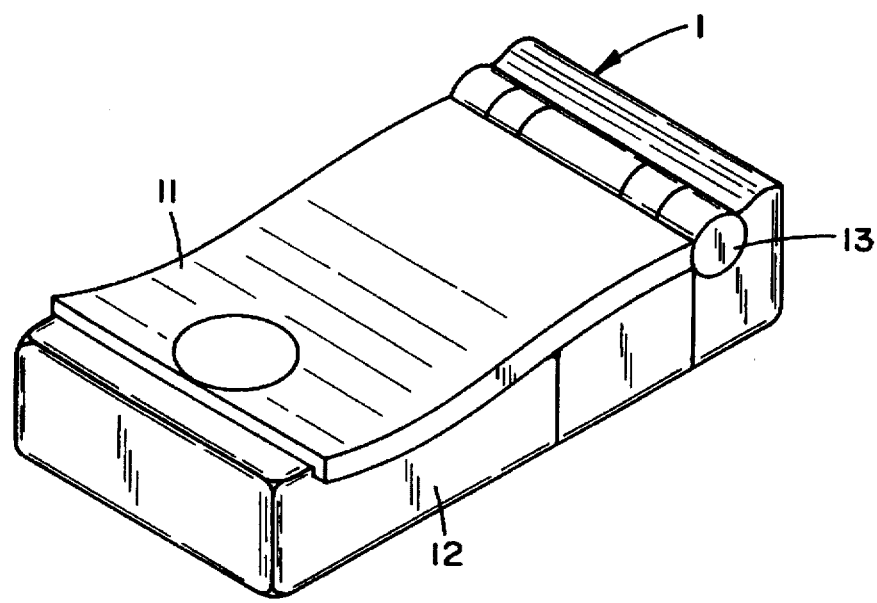
FIGS. 1 and 2 are perspective views showing the states where a portable wireless apparatus of the invention is folded and opened, respectively.
Figure 2:
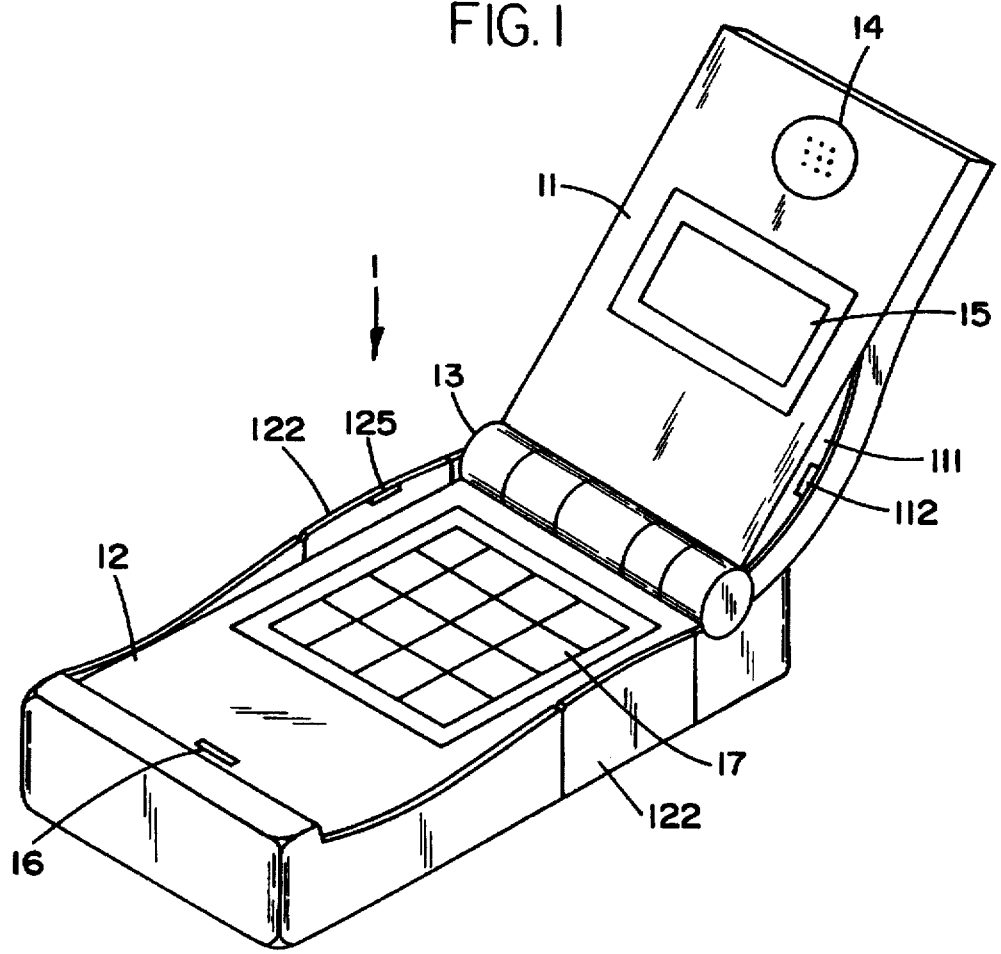
Figures 3, 4:
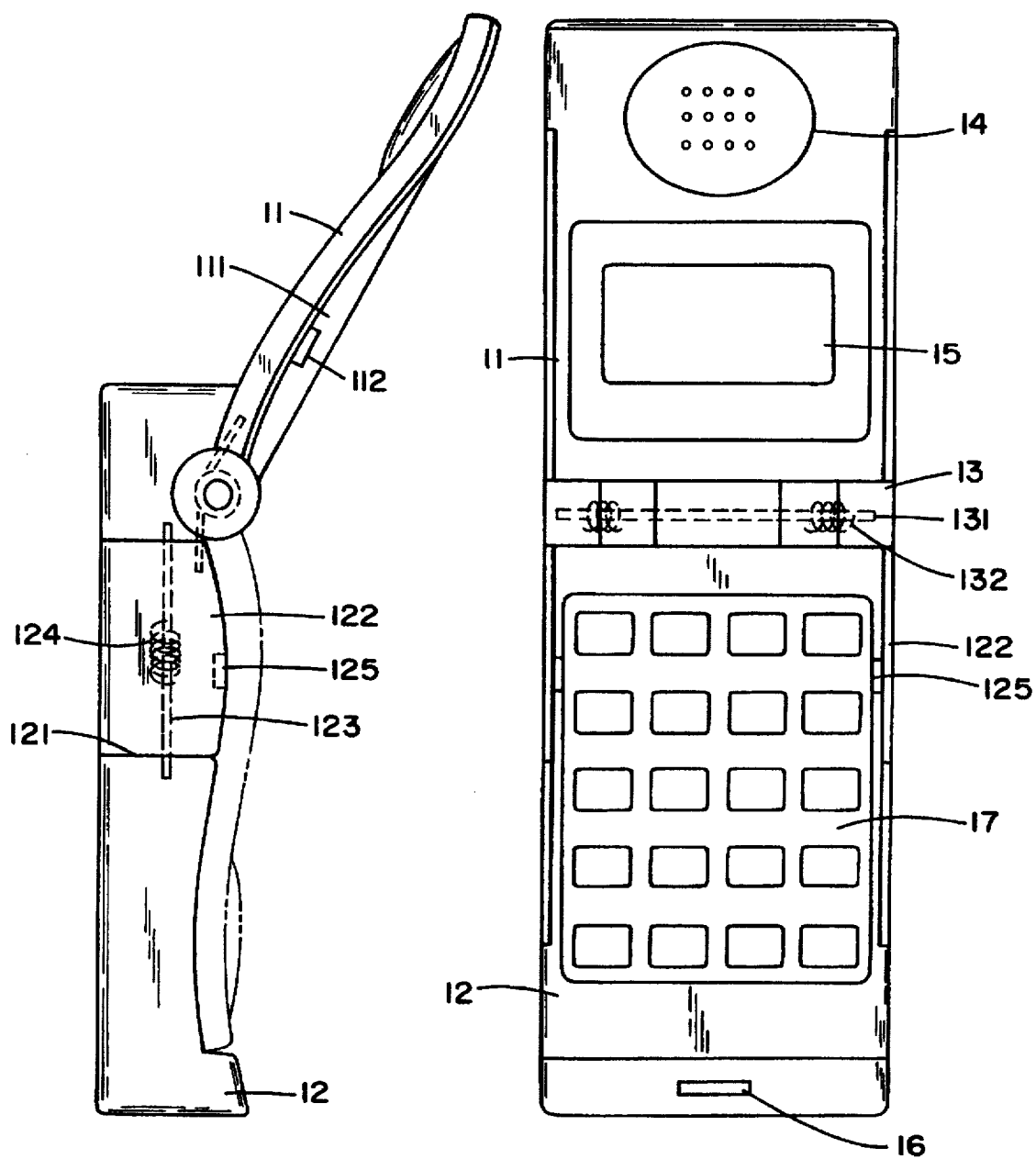
FIGS. 3 and 4 are a front view and a side view showing the state where the portable wireless apparatus of the invention is opened.

FIG. 1 is a perspective view showing the state where an embodiment of a portable telephone to which the present invention is applied is folded, and FIG. 2 is a perspective view showing the state where the embodiment is opened. FIGS. 3 and 4 are a front view and a side view showing the embodiment being opened. In these drawings, a body 1 is constituted by an upper case 11 and a lower case 12, and the upper and lower cases are connected to each other through a hinge portion 13 in a rotational direction. A receiver 14 and a display portion 15 are provided to the front face of the upper case 11. Further, a transmitter 16 and a key operation portion 17 are disposed to the lower case 12.

In the hinge portion 13, as shown in FIGS. 3 and 4, a shaft 131 made of a fine rod pierces the upper and lower cases 11 and 12, and torsion springs 132 are wound around this shaft 131. The torsion springs 132 give an impetus in such a manner that the elastic force acts on the upper enclosed body 11 in the upward direction as seen from the lower case 12, namely, in such a direction that the upper case 11 opens.

The outer shape of the upper case 11 and the front shape of the lower case 12 have the same surface shape so that the upper case 11 is accommodated along the surface of the lower case 12 when the upper case 11 rotates around the hinge portion 13 toward the lower case 12. Shallow concave grooves 111 (FIG. 2) are formed to the both side faces of the upper case 11 in the vicinity of the hinge portion 13, and a rectangular locking groove 112 is formed to a part of a side face of each shallow concave groove 111.

Figure 5:
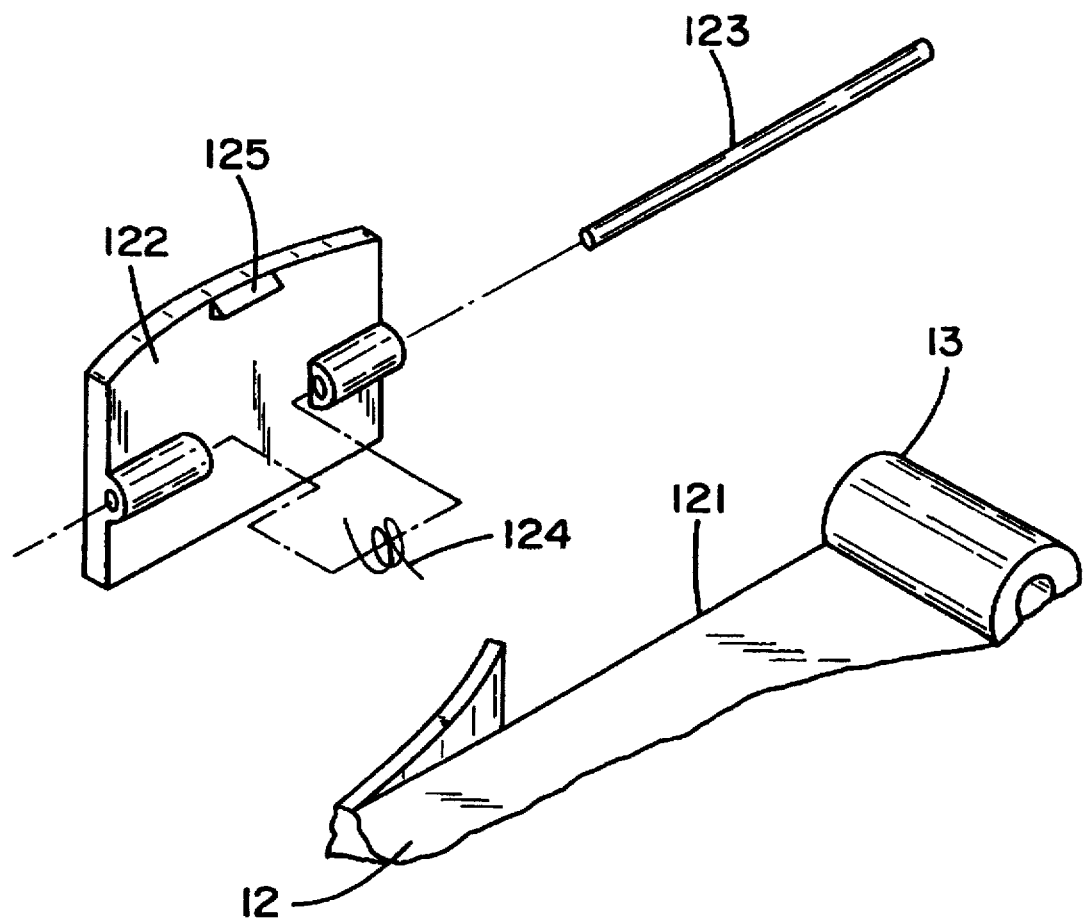
FIG. 5 is a partially exploded perspective view showing an open lever.
Figure 6:
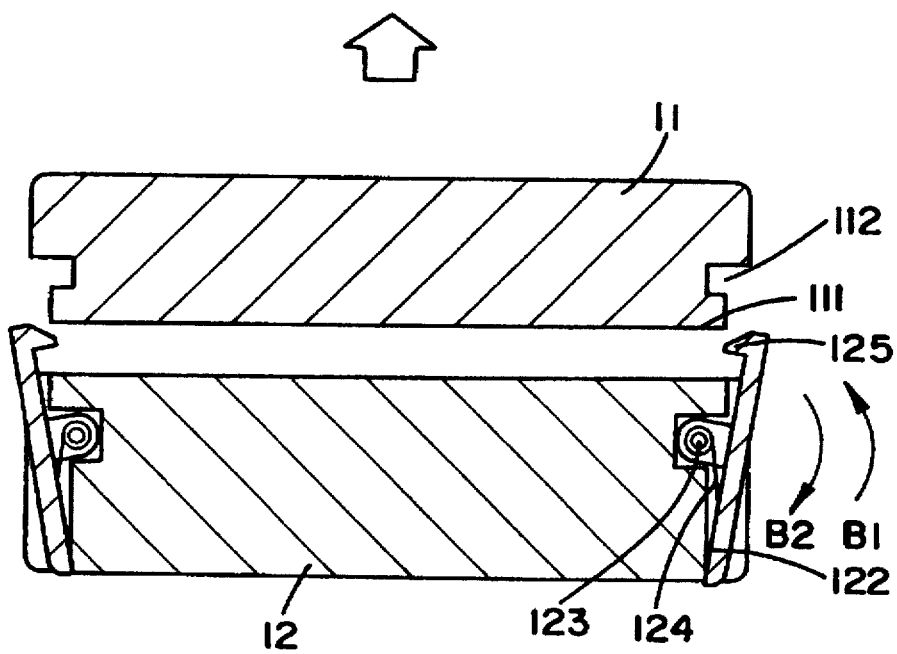
FIGS. 6 and 7 are sectional views showing the states where an upper case is opened and folded, respectively.
Figure 7:
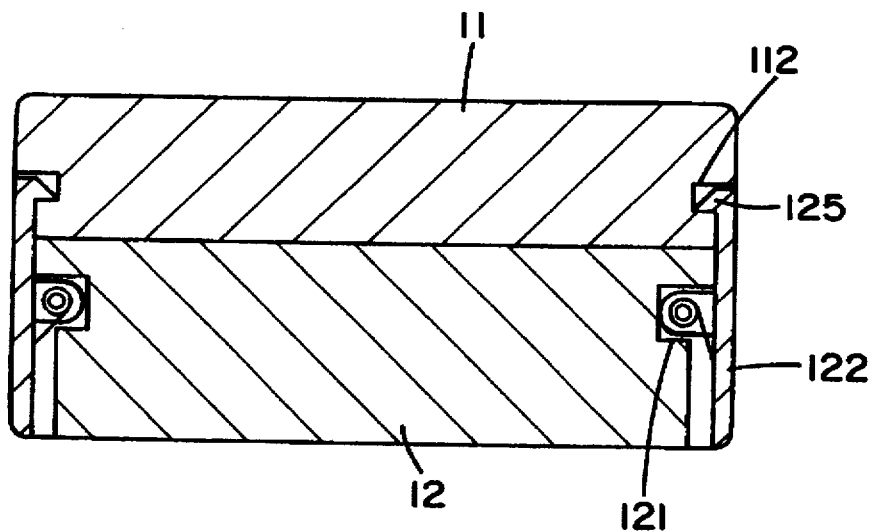

Referring to FIGS. 5 to 7, shallow concave portions 121 (FIG. 7) each having a relatively-large dimension are formed on the both side faces of the lower case 12 in the vicinity of the hinge portion 13, and a plate type open lever 122 is provided to each shallow concave portion 121 in such a manner that a front end of the lever 122 slightly protrudes from the front face of the lower case 12. In the respective concave portions 121, a pair of open levers 122 are supported to the lower case 12 through fixed shafts 123 extending in the longitudinal direction of the lower case 12 and, as shown in FIG. 6, they are so supported as to be capable of oscillation in directions indicated by arrow heads B1 and B2. In addition, coil springs 124 are wound around the fixed shafts 123, and the coil springs 124 give an impetus to the open levers 122 so that the spring force acts in the direction indicated by the arrow head B1, namely, in such a direction that the respective front ends of a pair of open levers 122 move closer to each other. Hooks 125 each having a tapered cross section are integrally formed to the inner surfaces of the front tips of the open levers 122, and the hooks 125 can engage with locking grooves 112 provided on the both side faces of the upper case 11.

According to this structure, when the upper case 11 is folded with respect to the lower case 12 as shown in FIG. 1, the front ends of the open levers 122 move into the shallow concave grooves 111 provided on the both sides of the upper case 11 as shown in FIG. 6, and the hooks 125 of the open levers 122 simultaneously engage with the locking grooves 112 of the upper case 11. At this time, since an impetus is given to the hooks 125 of the open levers 122 to move toward the locking grooves 112 by the elastic force of the coil springs 124, the engaged state established between the hooks 125 and the locking grooves 122 can be maintained by the elastic force of the coil springs 124.

When rear ends of the respective open levers 122 are pushed like in a pinching manner and the open levers 122 are oscillated against an impetus of the coil springs 124 in a direction indicated by an arrow head B2 in FIG. 3, the engagement attained between the hooks 125 and the locking grooves 112 are released. The upper case 11 thus swivels upwardly by an impetus of the torsion springs 132 of the hinge portion 13 to be opened from the lower case 12 as shown in FIG. 6.

In order to again obtain the closed state of the upper case 11, the upper case 11 may swivel against an impetus of the torsion springs 132 to be closed with respect to the lower case 12. The both side faces of the upper case 11 then move over the hooks 125 of the open levers 122, and the locking grooves 112 are again engaged with the hooks 125. Accordingly, the state shown in FIG. 7 is obtained, and hence the upper case 11 is again locked, thereby being closed.

In this way, in the portable telephone according to this embodiment, when the open levers 122 provided on the both side faces of the lower case 12 are, operated, the locked state achieved between the upper case 11 and the lower enclosed body 12 can be released, thus opening the upper case 11. In such a case, since the open levers 122 can be operated by pinching the levers 122 on the both sides by using a thumb and an index finger of a hand actually holding the portable telephone, the opening operation is facilitated, no matter which hand may be holding the portable telephone.

Further, in case of operating the open levers 122, since the longitudinal length of each open lever 122 is as large as the thickness of the lower case 12, the open levers 122 can be operated with a small force by a lever ratio of the open levers 122 even if the spring force of the coil springs 124 is increased to strengthen the engaging force between the hooks 125 and the locking grooves 112, thus enabling the easy opening operation. Meanwhile, since the locked state is not released until the rear ends of the open levers 122 are pinched, the locked state can not be released by only touching the front ends of the open levers 122. It is therefore possible to prevent the upper case 11 from being unwillingly opened. Further, in this case, even when one of the two open levers 122 provided on the both side of the lower case 12 is erroneously touched or when it is pushed, the locked state is still maintained by the other open lever 122, thus preventing the upper case 11 from being opened.

In particular, since the open levers 122 are provide in the shallow concave portions 121 formed to the lower case 12, the surfaces of the open levers 122 can be located on the same surface level with the surface of the lower case 12. Therefore, the open levers 122 can not exist as projections in the portable wireless apparatus, and the portability of the portable wireless apparatus can not be deteriorated, thereby preventing the open levers from being operated unwillingly when handling the portable wireless apparatus.

Although the open levers are provided to the lower case and the case is opened and/or closed by swiveling the upper case, the open levers may be provided to the upper case and the lower case may swivel to open and/or close the case. In addition, the locking grooves may be formed on the open lever sides, and the hooks may be formed on the side faces of the opposed enclosed body.

While this invention has been described with reference to an illustrative embodiment, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A folding portable wireless apparatus in which an upper case and a lower case are connected by a hinge to enable opening and/or closing said both cases, comprising:

opening impetus giving means for giving an impetus to said upper case and said lower case in an opening direction; and locking means provided to the both side faces of said upper case and said lower case, said locking means including open levers which are provided on the both side faces of either said upper case or said lower case and can be manually operated; engaging portions which are provided on the both side faces of the other case and interlock with said open levers to lock said both cases; and locking impetus giving means for giving an impetus to said open levers in such a direction that the locked state established between said open levers and said engaging portions is maintained, wherein said open levers are so provided to the both side faces of one case as to be capable of oscillation about a shaft; a hook or a locking groove is formed to one end of each of said open levers; and said engaging portions are provided on the both side faces of the other case and constituted by locking grooves or hooks with which said hooks or said locking grooves engage; and wherein said open levers can oscillate in a direction of the thickness of one case; one end of each of said open levers protrudes from the front face of the case; a hook or a locking groove is formed on the inner face of said one end; and said locking impetus giving means inwardly gives an impetus to said one end.

* * * * *